United States Patent [19]

Jeram

[11] 4,029,629
[45] June 14, 1977

[54] SOLVENT RESISTANT ROOM TEMPERATURE VULCANIZABLE SILICONE RUBBER COMPOSITION

[75] Inventor: Edward M. Jeram, Burnt Hills, N.Y.

[73] Assignee: General Electric Company, Waterford, N.Y.

[22] Filed: Oct. 6, 1975

[21] Appl. No.: 619,591

[52] U.S. Cl. .................. 260/37 SB; 260/46.5 UA; 260/46.5 H; 260/825
[51] Int. Cl.$^2$ .................. C08L 83/08; C08G 77/24
[58] Field of Search ...... 260/825, 46.5 UA, 46.5 H, 260/37 SB

[56] References Cited

UNITED STATES PATENTS

| | | | |
|---|---|---|---|
| 3,050,411 | 8/1962 | Keil | 260/825 |
| 3,461,185 | 8/1969 | Brown | 260/825 |
| 3,607,832 | 9/1971 | Hansen | 260/825 |
| 3,627,851 | 12/1971 | Brady | 260/825 |

*Primary Examiner*—Wilbert J. Briggs, Sr.
*Attorney, Agent, or Firm*—John L. Young; E. Philip Koltos; Frank L. Neuhauser

[57] ABSTRACT

A solvent resistant room temperature vulcanizable silicone rubber composition comprising a blend of vinyl-terminated polysiloxanes having from 2 to 98 mole percent of alkylperfluoroalkylalkylene siloxy units in the polymer chain, a hydride cross-linking agent selected from the class consisting of hydride-containing resins composed of mono-functional units and tetrafunctional units and hydride-containing polysiloxanes or a mixture of the above cross-linking agents which composition is cured in the presence of a platinum catalyst.

The above composition cures to an elastomer at room temperature or elevated temperatures. Preferably, there is incorporated into the composition a treated filler which gives the cured elastomer physical strength properties.

20 Claims, No Drawings

SOLVENT RESISTANT ROOM TEMPERATURE VULCANIZABLE SILICONE RUBBER COMPOSITION

BACKGROUND OF THE INVENTION

The present invention relates to solvent resistant silicone compositions and more particularly relates to polysiloxane compositions having perfluoroalkylalkylene substituent groups which in the cured form produces an elastomer with exceptionally good resistance to hydrocarbon solvents, as well as good strength properties.

Silicone elastomers are widely valued for their resistance to moisture as well as high and low temperature stability characteristics. In certain cases where such properties are desirable, it is also desirable that the silicone elastomer have solvent resistance to hydrocarbon fluids and specifically such hydrocarbon fluids such as, gasoline, jet fuel and crude oil and various by-products of crude oil.

In a successful attempt to obtain a silicone elastomer with the high and low temperature stability of silicone elastomers and also good solvent resistance, fluorinated substituted polysiloxane compositions were developed. See, for instance, U.S. Pat. Nos. 2,979,519 of Pierce et al and 3,179,619 of Brown. The above patents recite methods and processes for producing heat cured silicone rubber compositions which cure to an elastomer having therein perfluoroalkylalkylene substituent groups which results in the final heat cured silicone elastomer having desirable solvent resistance to hydrocarbon fluids.

However, one of the disadvantages of such heat cured silicone rubber compositions is their high viscosities in the uncured state which may be as high as 50,000,000 centipoise at 25° C. This is well known in heat cured silicone rubber technology and results in time consuming and expensive procedures in processing the heat cured silicone rubber composition in the uncured state. Accordingly, it is highly desirable to have a low viscosity composition in the uncured state which can be easily and economically processed to produce a solvent resistant fluorinated substituted silicone elastomer. Some attempts have been made to produce silicone compositions which in the uncured state have desirably low viscosities and also good physical properties comparable to that of the solvent resistant elastomers produced from heat vulcanizable silicone rubber compositions.

However, such attempts to produce such a silicone rubber composition, for instance, by incorporating fluorinated substituent groups in standard one-part room temperature vulcanizable silicone rubber compositions and a two-part room temperature vulcanizable silicone rubber composition have not been altogether successful.

The difficulty with one-part room temperature vulcanizable silicone rubber technology is that the composition has to be maintained in an anhydrous state prior to cure. Thus, such compositions are difficult to use in processing equipment for the purpose of fabricating desirable solvent resistant parts.

Accordingly, it was an unexpected discovery that SiH-olefin platinum catalyzed silicone rubber compositions could be produced which had desirable solvent resistant properties as well as physical properties comparable with that of the solvent resistant heat cured silicone rubber compositions.

It is one object of the present invention to produce a silicone rubber composition which can be cured at room temperature or elevated temperatures which is solvent resistant.

It is another object of the present invention to produce a silicone rubber composition which can be cured at room temperature or elevated temperatures which has physical properties comparable to that of heat vulcanizable silicone rubber compositions and which is solvent resistant.

It is an additional object of the present invention to produce silicone rubber compositions in which the polymers in the composition have fluorinated substituent groups and in which the curing mechanism comprises the reaction of a vinyl-containing polysiloxane with hydrogen containing silanes or polysiloxanes in the presence of a platinum catalyst.

It is yet an additional object of the present invention to provide for a process for economically and efficiently producing solvent resistant silicone rubber compositions.

It is still another object of the present invention to provide for a process for producing solvent resistant silicone rubber compositions which in the uncured state are of low viscosity and have excellent processability properties.

These and other objects of the present invention are explained by means of the disclosure below.

SUMMARY OF THE INVENTION

There is provided by the present invention a solvent resistant room temperature vulcanizable silicone rubber composition comprising (A) 100 parts of a mixture composed of (i) 100 parts of a vinyl-containing polymer of the formula,

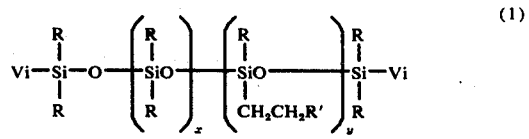

where Vi is vinyl, R is selected from the class consisting of alkyl radicals of 1 to 8 carbon atoms and phenyl, R' is perfluoroalkyl of 1 to 8 carbon atoms, x and y are at least 1, and the viscosity of the compound varies from 1,000 to 500,000 centipoise at 25° C, and the concentration of the siloxy unit taken y times varies from 5 to 98 mole percent; (ii) from 0.1 to 50 parts per million of the total composition of a platinum catalyst; and (B) from 1 to 50 parts based on 100 parts of the mixture of (A) of a cross-linking polymer selected from the class consisting of (iii) a resin having

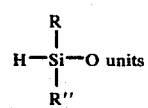

and $SiO_2$ units where the R + H + R'' to Si ratio varies from 1.0 to 2.7; (iv) a resin having

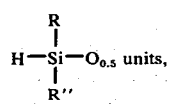

SiO$_2$ units and RR''SiO units where the R + H + R'' to Si ratio varies from 1.2 to 2.7 and (v) a polymer of the formula,

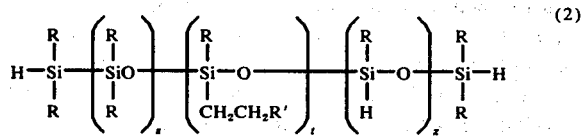

where the concentration of the units taken $t$ times preferably varies from 0 to 98 mole percent and mixtures thereof where R, R' are as previously defined, $s$ is at least 1, $t$ may be zero, but is preferably at least 1, $z$ may be zero or a positive integer and the viscosity of the polymer varies from 10 to 1000 centipoise at 25° C, and R'' is selected from the class consisting of alkyl radicals of 1 to 8 carbon atoms and —CH$_2$CH$_2$R' radicals.

The platinum catalyst which will be explained below may be a platinum deposit in the solid carrier such as, charcoal or gamma-aluminum or it can be a solubilized platinum catalyst such as, chloroplatinic acid or any of the well known platinum complexes.

This composition will cure at room temperature or at a much faster rate at elevated temperatures to produce a solvent resistant silicone elastomer. It is preferable that there be incorporated into the composition and specifically part (A) of the composition from 5 to 100 parts of a filler so as to give the final cured silicone elastomer high tensile strength and elongation so that the material will have strength properties comparable to that of heat vulcanizable silicone rubber compositions. More preferably, the filler is selected from the class consisting of fumed silica and precipitated silica which has been treated with a silicone compound so as to make it hydrophobic and allow it to impart to the silicone rubber composition enhanced physical properties, and specifically tensile strength. Thus, the filler may be treated with a cyclicpolysiloxane or a silyl nitrogen compound as is well known in the art and will be explained below. For an optimum cross-linked elastomer it is desirable to incorporate into the composition certain vinyl-containing polymers which will be explained herein below.

The composition may also include a cure inhibitor to allow the composition to have a sufficiently long work life at room temperature that is desirable for the particular fabrication technique in which the composition will be used. There may be incorporated into the composition various additives such as, heat stability additives, for instance, iron oxide.

The process for forming the silicone elastomer involves mixing the vinyl-containing polymer with the filler incorporated in them, the platinum catalyst with an inhibitor, if any, and the heat stabilizing agent in a one component. The hydride cross-linking agent is packaged separately in a second component. When it is desired to cure the composition, the two components are simply mixed together and the composition (depending on the amount of inhibitor that has been incorporated in it and depending on the temperature at which the cure takes place) will be allowed to cure to a solvent resistant silicone elastomer.

By means of the above composition, there is provided a solvent resistant silicone rubber composition with appropriate low viscosity properties which can be cured either at room temperature or at elevated temperatures if a shorter cure cycle is desired. Thus, depending on the temperature and the amount of inhibitor that is utilized, the above composition in the uncured state and having the desirable low viscosity may cure in a period of time varying anywhere from 1 minute to 5 hours or more, as is desired in the processing and fabricating technique that the composition is utilized in.

DESCRIPTION OF THE PREFERRED EMBODIMENT

The polymer of Formula (1) above is one of the basic ingredients in the present composition where R is selected from alkyl radicals of 1 to 8 carbon atoms and phenyl is preferably an alkyl radical of 1 to 4 carbon atoms such as, methyl, ethyl, etc. The R' radical may be any perfluoroalkyl radical of 1 to 8 carbon atoms but is most preferably, perfluoromethyl. Generally, for $x$ and $y$, the $x$ may vary from 1 to 1000 and $y$ may vary from 1 to 1000. These symbols must be at least 1 and can have any values such that the viscosity of the fluid generally varies from 1000 to 500,000 centipoise at 25° C, and preferably varies from 1000 to 200,000 centipoise at 25° C. Most preferably, the viscosity of the above polymer of Formula (1) varies from 1000 to 70,000 centipoise at 25° C.

Another important limitation in the polymer of Formula (1) is that the alkyl perfluoroalkylethylene siloxy substituent units taken y times must be present in the polymer at a concentration of generally anywhere from 5 to 98 mole percent and preferably 30 to 98 mole percent. It is most preferred that the concentration of the alkyl perfluoroalkylethylene siloxy units taken y times be present at a concentration of 50 to 98 mole percent since the best solvent resistance is obtained at that concentration.

To give the final composition of Formula (1) the proper processability there may optionally be incorporated in the composition from 1 to 85 parts of a vinyl-containing compound of the formula,

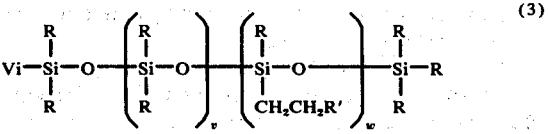

where R, Vi, R' are as previously defined, v and w are at least 1, and the concentration of the Vi(R)$_2$SiO$_{0.5}$ units with respect to the total terminal units in the polymer varies from 20 to 100 mole percent and the viscosity of the polymer varies from 100 to 200,000 centipoise at 25° C.

In Formula (3), R again may be an alkyl radical of 1 to 8 carbon atoms or phenyl and R' is a perfluoroalkyl radical of 1 to 8 carbon atoms and is most preferably perfluorinated methyl, v and w are positive integers of at least 1 and generally v varies from 1 to 800 and w varies from 1 to 800 such that the final viscosity of the polymer at 25° C can vary from 100 to 100,000 centipoise and preferably varies from 100 to 20,000 centipoise at 25° C.

As with the polymer of Formula (1), the polymer of Formula (3) must have the alkyl perfluoroalkylethylene siloxy units taken w times and be at such a concentration such that the substituent groups in the total polymer vary from 5 to 98 mole percent and more preferably for optimum solvent resistant properties vary from 30 to 98 mole percent.

An important distinction between the polymer of Formula (3) and the polymer of Formula (1) is the presence in (3) of trialkyl siloxy terminal units as well as vinyldialkylsiloxy terminal units. Both units must be present in the polymer mixture. However, it is realized that in the production of such polymers there will be some polymer species terminated on both ends with trialkyl groups and there will be some polymer species terminated on both ends with vinyldialkylsiloxy units. In the polymer species of Formula (3), there must be present both types of terminal units in order to give the final uncured composition proper plasticity, as well as to give the final cured elastomer prepared from the composition the proper modulus. However, it is very important that the concentration in the polymer species of Formula (3) of the vinyldialkylsiloxy units to the total terminal units be carefully controlled such that the concentration of the vinyldialkylsiloxy units vary from 20 to 98 mole percent and preferably 50 to 98 mole percent.

The production of these polymers has been brought about by an advance in the art. A description of how these polymers may be produced is set forth in the patent application of John S. Razzano, Ser. No. 574,332, filed May 5, 1975. Briefly, these polymers of both viscosities may be prepared by equilibrating or heating at elevated temperatures, octaalkylcyclictetrapolysiloxanes with tetraalkyltetraperfluoroethylenecyclictetrasiloxanes in the presence of an equilibration catalyst. Most preferred, as shown in the above application for such equilibration procedures, are the cesium hydroxide, potassium silanolate and sodium silanolate catalysts, since they result in the highest yield of the desired polymer. However, if such high yields are not desired, a secondary catalyst such as, potassium hydroxide and sodium hydroxide may be utilized.

To control the end viscosity of the polymer of Formulas (1) and (3), there is incorporated in the reaction mixture the desired amount of chain-stoppers which may be divinyltetraalkyldisiloxanes, divinylhexaalkyltrisiloxanes and other low molecular weight linear polysiloxanes. Such chain stoppers in the case of the polymer of Formula (1) have one vinyl unit on the terminal siloxy atom on the polymer chain such as, for instance, divinyltetramethyldisiloxane. In the case of the production of the polymer of Formula (3), there is utilized low molecular weight chain-stoppers again in which one terminal unit has a vinyldialkylsiloxy unit and in which the other terminal group has a trialkylsiloxy unit. Or there may be utilized a mixture of chain-stoppers for the production of the polymer of Formula (3) in which the mixture contains low molecular weight polymers having vinyldialkylsiloxy terminal units on both ends of the chain, and the other chain-stoppers in the mixture have trialkylsiloxy terminal units. Irrespective of which approach is utilized in terms of the utilization of chain-stoppers, the same general polymeric species within the scope of Formula (3) results. In either case, with the proper chain-stoppers to control the final molecular weight of the compound, the mixture is heated in the presence of the catalyst at temperatures between 0° to 90° C for a period of time varying from anywhere from 5 to 20 hours until equilibration is reached, that is, as much of the cyclicsiloxanes are being converted to the linear polymer as there is of the linear polymer being reconverted back into the cyclicsiloxanes. At that time, the mixture is cooled and a neutralization agent is added to neutralize the catalyst. Then the cyclics are removed by stripping to yield the desired polymers, as explained in the above Razzano patent application.

Another alternative procedure is to carry out the same equilibration process described above except at higher temperatures, that is, above 100° C and utilizing the octaalkylcyclictetrasiloxane and a perfluoroethylene containing cyclictrisiloxane as the main ingredients. The production of cyclictrisiloxanes is described in the foregoing Pierce and Holbrook patent, referred to previously.

The base compound is kept separate from the cross-linking agent as is well known in the technology. The cross-linking agent may be comprised of any of a series of hydride cross-linking agents described above or a mixture thereof. Thus, one cross-linking agent that may be utilized is a resin composed of

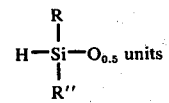

and $SiO_2$ units where the $R + H + R''$ to Si ratio varies from 1.0 to 2.7. In the above formula, R may be an alkyl radical of 1 to 8 carbon atoms or phenyl. $R''$ is a lower alkyl radical of 1 to 8 carbon atoms or phenyl or a $-CH_2CH_2R'$ radical where $R'$ is as previously defined. Most preferably, $R''$ is the perfluoroalkylethylene radical.

Another type of cross-linking agent that may be utilized in the composition is a resin composed of

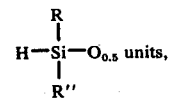

$SiO_2$ units and $RR''SiO$ units where the $R + H + R''$ to Si ratio varies from 1.2 to 2.7, the above resin being composed of monofuctional, tetrafunctional and difunctional unit and R and $R''$ are as previously defined above for the resin composed of monofunctional and difunctional units. However, in this second resin composed of monofunctional, tetrafunctional and difunctional units it is preferred that either the monofunctional unit or difunctional unit contain at least one perfluoroalkylethylene substituent group. Most preferably, both the monofunctional and difunctional should contain such a substituent group. However, it should be noted, irrespective of the above, that both resins will function as effective cross-linking agents to give a desirable silicone elastomer with desirable solvent resistance irrespective of whether the other $R''$ substituent group in the above resin is a fluorinated substituent group or whether it is a non-fluorinated substituent group. These resins are produced by a simple well known procedure that is common to the production of such resins.

The above resins may be prepared under one method by reacting a silica hydrosol with the corresponding chlorosilanes or alkoxylated silanes and mixtures thereof wherein the chlorosilane has a hydride group.

The silica hydrosols employed are prepared in the usual manner by neutralizing sodium silicate solutions. This neutralization may be carried out either by employing an acid or a chlorosilane. In the latter case, it is not necessary to add any additional acid to the reaction mixture. Whereas the silica sol at any concentration would react with the above defined organosilicon compounds under acid conditions, it is preferred that the sol have a concentration of from 1 to 35 percent by weight of $SiO_2$.

The silanes and siloxanes may be employed individually or in a mixture. In such cases, the chlorosilane may be added directly to the sodium silicate solution. In the case where alkoxysilanes are employed, it is necessary that the silica hydrosol contain sufficient acid so that the pH of the reaction mixture will be less than five. Suitable acids are hydrochloric, sulfuric, nitric, phosphoric, benzenesulfonic, trichloroacetic or any other type of strong acid. Any amount of excess acid other than that which is necessary to lower the pH below 5 may be employed.

Any of a large group of compounds within the above formulas may be used to prepare this silicone resin. Specific examples of individual compounds which are satisfactory are hydrogen dimethylchlorosilane, hydrogen dimethylethoxysilane, hydrogen dimethylisopropoxysilane, dihydrogentetramethyldisiloxane, polydimethylsiloxane, stearyltrichlorosilane, dimethyldichlorosilane, and perfluoromethylethylenemethyldichlorosilane and trifluoropropyldimethylchlorosilane.

The silica hydrosol is simply mixed with the silanes and/or siloxanes to form the required silicone resin. As mentioned previously, a strond acid is added to lower the pH to below 5 if a chlorosilane is not involved in the reaction. At this time it is necessary to add a lower alcohol such as, isopropanol to stabilize the system. It has been found that the reactions between silica hydrosol, silanes and/or siloxanes proceeds rapidly at 30° C or above to produce the copolymeric siloxanes. During the reaction the mixture is preferably thoroughly agitated. In general, an emulsion forms which separates into two layers upon standing. The layers are then separated and the organnosilicon layer with the acid therein is cooled at elevated temperatures to reduce its silanol content to below 0.5 weight percent as desired below. The acid and solvent are then stripped off to yield the desired resin. More specific details as to this process can be found in Daudt et al, U.S. pat. No. 2,676,182.

Another method for forming the desired resin of the present invention is by the controlled hydrolysis of compounds such as those having the formulas $HRSiX_{4-n}$, $HR''RSiX$, $R''RSiX_2$, R, R'' are as previously defined, X represents a halogen atom, n may vary from 1 to 2. The above halogen compounds were reacted with ethyl orthosilicate to provide the desired resins. A solution of the halogensilane in an inert non-alcohol organic solvent is formed in which the organic solvent is insoluble or substantially insoluble in water and is selected from the class consisting of (1) aliphatic and aromatic liquid hydrocarbons, and (2) liquid ethers containing at least 4 carbon atoms. This solution is gradually added to a two-phase hydrolyzing medium comprising a mixture of water in an amount considerably in excess of that calculated as having to hydrolyze the silane, and a liquid aliphatic alcohol which is not completely soluble in water but which dissolves and appreciable amount of water.

Alcohols that are suitable are lower aliphatic alcohols such as, methyl and ethyl alcohol. In addition, ethyl and butyl acetate which are the preferred non-alcoholic solvents for the silane derivatives can be used and any ketone such as, acetone and various others. The halosilanes are dissolved in the solvent and water is added to the mixture. The mixture is vigorously stirred during the reaction which is exothermic. After the reaction has proceeded to completion, the agitation is discontinued and the reaction mixture allowed to separate into two layers. The lower aqueous layer is removed and the organic layer is heated with the acid therein at temperatures of 100°–175° C for 0.5 to 6 hours until the silanol content of the resin is less than 0.5 weight percent. Then the solvent is stripped off to yield the desired resin. Although resin of less than 0.5 weight percent silanol does not have to be used in the present composition, it has been found that such a hydride resin results in a cured elastomer with better physical properties.

In the hydride polysuloxane of Formula (2), as explained above, R may be an alkyl radical of 1 to 8 carbon atoms or phenyl or both, R' is perfluoroalkyl. In the above formula, s may generally vary from 1 to 500 and t may generally vary from 0 to 500, while z may be zero but is generally 1 to 500. As noted above, the hydride polysiloxane of Formula (2) may contain hydrogen atoms for crosslinking in the polymer chain for the purpose of increasing the cure rate and to obtain the resulting cured silicone elastomer as is desired. Such hydrogen atoms in the polymer chain are not necessary to obtain the advantageous solvent resistant silicone elastomer of the present invention.

Accordingly, z may be zero but preferably has the values set forth above. It is only necessary that the values of s, t, and z be within such values within the above ranges such that the resulting hydride polysiloxane polymer of Formula (2) has a viscosity that may vary anywhere from 10 to 1000 centipoise at 25° C and such that the polymer of Formula (2) has a has a hydrogen content of anywhere from 0.1 to 5.0 percent by weight. This hydrogen polysiloxane as was the case with the hydride resins may not contain perfluoroalkylethylene substituent groups and generally the concentration of the perfluoroalkylethylene siloxy units in the polymer will vary from 0 to 98 mole percent of the total substituent groups and most preferably will vary from 30 to 75 mole percent. The hydrogen polysiloxane of Formula (2) may be prepared by a similar equilibration procedure as the procedure set forth above for producing the vinyl polysiloxane polymers of Formulas (1) and (3) with the exception that an acid equilibration catalyst must be used such as, a sulfuric acid. It is only necessary to obtain the hydride siloxy units in the polymer chain as desired to utilize in the equilibration procedure, tetraalkyltetrahydrogencyclictetrasiloxanes and also to utilize appropriate hydride containing chain-stoppers in the proper amounts to obtain the desired viscosity polymer.

It must be noted that any of the hydride containing resins as well as the hydrogen polysiloxane polymer of Formula (2) individually or mixtures thereof may be utilized as cross-linking agents with the vinyl polysiloxanes of Formulas (1) and (3) to produce the desired composition of the present case.

Optionally, to increase the hardness of the cured composition there may be added a third vinyl-containing polymer. Thus, per 100 parts of the vinyl-terminated base polymer there may be added from 1 to 30 parts and preferably from 3 to 15 parts of a polymer of the formula,

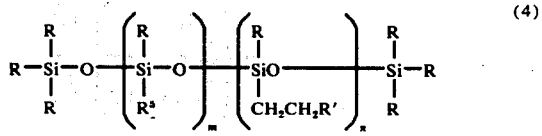

(4)

$m$ and $n$ are at least 1 and $m$ varies from 1 to 5000 and $n$ varies from 1 to 5000, R is selected from alkyl radicals of 1 to 8 carbon atoms, R' is a perfluoroalkyl radical of 1 to 8 carbon atoms, $R^5$ is selected from the class of alkyl radicals of 1 to 8 carbon atoms, vinyl radicals and mixtures thereof. The above polymers in accordance with the present invention preferably has an alkylvinylsiloxy content that varies from 0 to 80 mole percent and preferably from 10 to 80 mole percent and an alkylfluoroalkylalkylenesiloxy content that varies from 5 to 98 mole percent and preferably from 30 to 95 mole percent. Preferably, the polymer has a viscosity that varies from 100,000 to 10,000,000 centipoise at 25° C, and more preferably a viscosity that varies from 500,000 to 2,000,000 centipoise at 25° C. This polymer is prepared by the same methods as were described for the other vinyl-containing fluorinated polymer except that there is utilized as one of the reactants an alkylvinyltetracyclicpolysiloxane and a saturated aliphatic or haloaliphatic chain-stopper.

To cure the above basic components there is necessary a platinum catalyst which may be platinum deposit on solid carrier such as, charcoal, or platinum deposit on gamma-aluminum. In order for the catalyst to cure the composition at the appropriate rate there may be utilized anywhere from 1 to 50 parts per million of the total composition in terms of platinum metal.

It must be understood that within the scope of the present invention platinum catalyst as defined herein not only means platinum metal deposited on a solid carrier but means platinum in any form and more specifically in the form of a platinum complex. These platinum complex catalysts are preferred because the platinum is more soluble in the reacting components and depending on which platinum complex catalyst is used usually results in a faster reaction rate. Such a platinum complex catalyst may be, for instance, chloroplatinic acid. Preferred platinum catalysts are those platinum compound catalysts which are soluble in the present reaction mixture. The platinum compound can be selected from those having the formula $(PtCl_2 \cdot Olefin)_2$ and $H(PtCl_3 \cdot Olefin)$ as described in U.S. Patent 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride cyclopropane complex $(PtCl_2 \cdot C_3H_6)_2$ described in U.S. Pat. No. 3,159,522, Ashby.

Still, further, the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

All the patents and patent applications mentioned in this present specification are incorporated into the present application by reference.

The preferred platinum compound to be used not only as a platinum catalyst but also as a flame retardant additive is that disclosed in U.S. Pat. No. 3,775,452, Karstedt. Generally speaking, this type of platinum complex is formed by reacting chloroplatinic acid containing 4 moles of water of hydration with tetravinylcyclotetrasiloxane in the presence of sodium bicarbonate in an ethanol solution.

The above are the basic ingredients to produce a solvent resistant silicone rubber composition of the present case. However, to increase the tensile strength and toughness of the final cured silicone elastomer, it is preferred to incorporate into it a filler. Illustrative of the many fillers which can be employed are titanium dioxide, lithopone, zinc oxides, calcium silicate, silica aerogel, barium oxide, diatomaceous earth, calcium carbonate, fumed silica, silazane, treated silica, precipitated silica, glass fibers, magnesium oxide, chromic oxides, zirconium oxides, aluminum oxide, alpha quartz, calcined clay, asbestos, carbon, graphite, cork, cotton, synthetic fibers and etc. It has been found that fumed silica and precipitated silica are the best fillers for the present composition in terms of optimizing the cured compositions tensile strength and toughness and the most advantageous and optimum results are obtained with fumed silica which has been treated. Thus, the silica fillers may be treated as, for example, as disclosed in U.S. Pat. No. 2,938,009, Lucas, with cyclicopolysiloxanes.

Another method for treated and untreated fillers that can be utilized in the invention of the instant case is that disclosed in Brown, U.S. Pat. No. 3,024,126, both of which patents are incorporated into the present case by reference.

Most desirably, silazane treated fillers in accordance with the disclosure of Smith, U.S. Pat. No. 3,635,743 and Beers, U.S. Pat. No. 3,847,848 are preferred as the treated fillers to be utilized in the composition of the present case.

With the treated fumed silica and specifically with the silazane treated fumed silica disclosed in the foregoing Smith and Beers patents which are incorporated by reference into the present case, there is obtained a solvent resistant silicone composition which cured into an elastomer with an exceptional combination of tensile strength, elongation and hardness.

In preparing the composition there is first formed a first component, mixture A, which is packaged separately into which mixture A, per 100 parts of the vinyl-containing polymer of Formula (1), there is incorporated 1 to 85 parts of the vinyl-containing polymer of Formula (3) and preferably 1 to 60 parts and optionally 1 to 30 parts of the polymer of Formula (4). To this mixture A and to the blend of vinyl-containing polysiloxanes there is added, generally, from 5 to 100 parts of the filler and more preferably from 5 to 75 parts of the filler. To this there may be added the vinyl in-chain polymer. Into this mixture A there is then enclosed a platinum catalyst in the concentrations specified above. To cure the composition there is simply mixed into it the hydride resin or hydrogen polysiloxane discussed above or mixtures thereof which is the second component. Generally, there may be utilized from 0.1 to 50 parts of the hydride cross-linking agent or mixtures thereof per 100 parts of mixture A, and more preferably from 0.5 to 10 parts of the hydride cross-linking agent per 100 parts of mixture A. After the two parts are mixed together, the composition may be fabricated into whatever form and cured at room temperature or at extremely short periods of time at elevated temperatures such as, 100° C or more. For most applications it is desired that the composition cure at room temperature and have a work life of at least 1 hour, preferably, 2 to 5 hours to allow fabrication machinery to operate on the composition to fabricate various parts from the mixture. To provide such extended work life to the composition there may be incorporated into the first component, a hydride cross-linking agent, an inhibitor. Thus, generally, there may be incorporated into the composition in mixture A from 100 to 10,000 parts per million of an alkylarylcyclicpolysiloxane to give the composition the extended work life that is desired in many applications.

Examples of such alkenyl-containing cyclicpolysiloxanes are tetramethyltetravinylcyclictetrasiloxane, tetramethyltetraallylcyclictrisiloxanes, tetraethyltetraallylcyclictripolysiloxanes.

It is, of course, understood that various other ingredients may be added to the basic composition to improve its properties. These additives are well known in the silicone art, for instance, iron oxide which may be added to mixture A at a concentration of anywhere from 0.1 to 5 parts as a heat stabilizing additive and more specifically, red iron oxide may be added in the above concentrations in order to function both as a heat stabilizing additive and also a pigment. In addition, in the case where red iron oxide is not used, other pigments may be added to the composition or flame retardant additives.

There is, thus, obtained by the present invention a solvent resistant silicone elastomer which cures at room temperature or alternately at elevated temperatures which is prepared in two components, that is, the mixture A defined above and the hydride cross-linking agent being the second component B, where the composition can be stored for extended periods of time and is of desirably low viscosity 1,000,000 – 10,000,000 centipoise at 25° C, which two components may then be mixed together and have a desirable work life and a low viscosity such that the material can be fabricated on various fabricating equipment. The cured elastomer that results from the composition has desirable solvent resistance and with filler in it has a tensile strength of at least 400 psi, % elongation of at least 100%, and a Durometer of at least 40. Without filler, the composition has desirable solvent resistance and can be used as an encapsulating compound.

The examples below are meant to illustrate the invention and are not intended or meant for the purpose of limiting the invention claimed in any way or manner. All parts are by weight.

EXAMPLE 1

There was first prepared a component A composed of 61.8 parts of a 40,000 centipoise at 25° C copolymer of the formula,

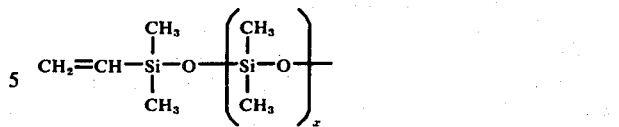

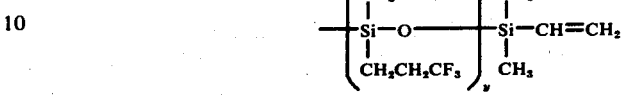

where $y$ has a value such that there is a 66 mole percent methyltrifluoropropyl concentration in the polymer and $x$ has a value representing the concentration of dimethylsiloxy units. To this there was added 14.56 parts of a 1300 centipoise at 25° C dimethylvinyl and trimethyl chain-stopped copolymer of the formula,

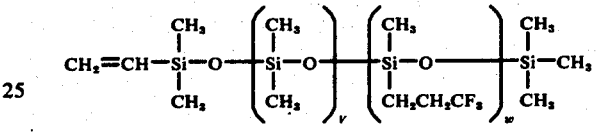

in which polymer $w$ has a value such that there is 66 mole percent methyltrifluoropropyl siloxy units in the polymer and $v$ has a value representing the concentration of the dimethylsiloxy units in the polymer, in which polymer the ratio of the $Vi(CH_3)_2SiO_{0.5}$ to the $(CH_3)_3SiO_{0.5}$ was 6:1. To this blend of vinyl-containing polysiloxanes there was added 19.6 parts of silazane treated fumed silica filler, 0.62 parts of red iron oxide as the heat stabilizing agent, and also as a pigment 15 parts per million of platinum in the form of a platinum complex, that is, platinum metal complex with a vinyl-containing polysiloxane and 1500 parts per million of methylvinyl tetramer.

To cure the composition there was added to it per 40 parts of Component A, 1 part of a resin composed of

and $SiO_2$ units where the ratio of the monofunctional to the tetrafunctional units was 2:1, where the R + H to Si ratio was 2, and where the hydride content was 0.9 percent by weight of the total resin. The resulting uncured composition had a viscosity of 4 to 6 million centipoise at 25° C, a specific gravity of 1.43, and a room temperature work life of at least 2 hours. The material cured to a solvent resistant elastomer which in a 24-hour period had a 44% volume swell in toluene and in a similar 24-hour period had a 33.3% volume swell in jet fuel. The resulting cured elastomer had the following physical properties:

| | |
|---|---|
| Tensile Strength | 590 |
| % Elongation | 210 |
| Shore A | 49 |
| Tear Strength, pi | 49 |
| 100% Modulus lbs., psi | 200 |

EXAMPLE 2

There was prepared a Component A composed of 61.8 parts of a 40,000 centipoise at 25° C of a dimethylvinyl chain-stopped copolymer of the formula,

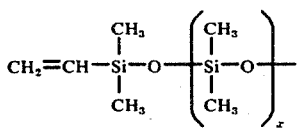

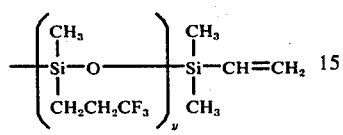

in which polymer y has a value such that there is 66 mole percent of methyltrifluoropropyl siloxy units in the polymer and x has a value representing the concentration of dimethylsiloxy units. To this polymer there was added 14.56 parts of a 1300 centipoise at 25° C of a dimethylvinyltrimethyl chain-stopped copolymer of the formula,

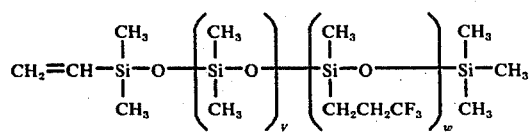

in which polymer w has a value such that there is 66 mole percent of methyltrifluoropropyl siloxy units in the polymer and v represents the concentration of dimethylsiloxy units. The ratio of $Vi(CH_3)_2SiO_{0.5}$ to the $(CH_3)_3SiO_{0.5}$ units was 6:1. To this blend there was added 19.6 parts of a silazane treated fumed silica filler in accordance with the procedure for preparing such fillers referred to above with respect to the Smith and Beers patents. To these ingredients there was then added 0.62 parts of red iron oxide as a pigment and stabilizing agent, 15 parts per million of platinum in the form of a platinum complex, that is, platinum metal complex with a vinyl-containing polysiloxane, and 1500 parts per million of methylallyl trimer. Other additives useful in such compositions may be added, of course, to the mixture A, but these are the basic ingredients to illustrate the reduction to practice of the present invention.

To 40 parts of Component A, there was added 1 part of hydrogen-containing polysiloxane of the formula,

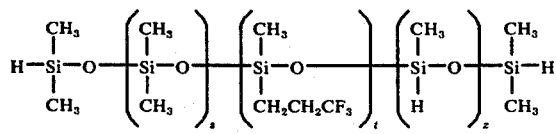

where the viscosity of the above polymer was 50 centipoise at 25° C and where t is such that the polymer contains 50 mole percent of methyltrifluoropropylsiloxy units and where the hydride content was 0.84 percent. The resulting mixture in the uncured state had a viscosity of 4 to 6,000,000 centipoise at 25° C; a specific gravity of 1.43 and a room temperature work life of at least 2 hours. The cured elastomer had a % volume swell in toluene of 42% and a % volume in swell in jet fuel of 31%. The cured elastomer had the following physical properties:

| | |
|---|---|
| Tensile Strength, psi | 425 |
| % Elongation | 130 |
| Shore A Durometer | 53 |
| Tear Strength, pi | 37 |
| 100% Modulus lbs., psi | 320 |

EXAMPLE 3

A Component A was prepared by mixing 61.8 parts of a 65,000 centipoise polymer of the formula,

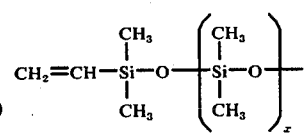

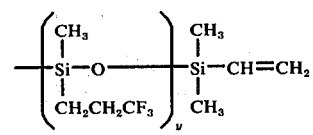

where y is equal to a value such that the polymer has a 37 mole percent concentration of methyltrifluoropropylsiloxy units and x has a value representing the mole percent concentration of dimethylsiloxy units. To this there was added 14.6 parts of a polymer of the formula,

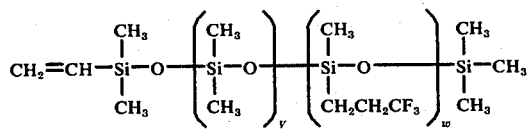

which polymer has a viscosity of 750 centipoise at 25° C and w has a value such that the concentration of the methyltrifluoropropylsiloxy units is 37 mole percent and v has a value representing the concentration of dimethylsiloxy units, and wherein the ratio of the $Vi(CH_3)SiO_{0.5}$ units to $(CH_3)_3SiO_{0.5}$ units is 1:1. To this mixture there was added 14.0 parts of silazane treated fumed silica, 12.0 parts of alpha quartz, 0.65 parts of red iron oxide, 10 parts per million of platinum in the form of the platinum complex described in the foregoing Lamoreaux patent and 1500 parts per million of tetramethyltetravinylcyclictetrasiloxanes. This mixture formed Component A.

Component B comprised 1.5 parts of a hydride resin composed of

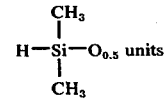

and $SiO_2$ units where the H + $CH_3$ to Si ratio was equal to 2, and the silanol content of the resin was less than 0.5 weight percent. The resin contained 0.9 weight percent of hydrogen. The viscosity of the uncured mixture of Component A and B was between 4 to 6,000,000 centipoise and had a room temperature work life of 2 hours. This composition was cured for an initial period of 1 hour at 300° F and then post cured for 8 hours at 400° F. The cured composition when tested for physical properties had the following physical properties:

| Tensile Strength, psi | 500 |
|---|---|
| % Elongation | 650 |
| Shore A Durometer | 25 |
| Tear Strength, pi | 73 |

EXAMPLE 4

There was formed a Component A in accordance with the same procedure as Example 3, where there was utilized 61.8 parts of the vinyl-terminated polymer of Example 3, 12.5 parts of the vinyltrimethylsiloxy-terminated polymer of Example 3, 15.0 parts of silazane treated fumed silica, 10.0 parts of 10 $\mu$ Minusil (alpha quartz), 0.65 parts of red iron oxide, 10 parts per million of platinum in the form of the platinum complex described in the foregoing Lamoreaux patent, and 1500 parts per million of tetramethyltetravinyltetracyclicsiloxane. To this mixture there was added a Component B which comprised 2.5 parts of the hydride resin of Example 3. The resulting mixture had a viscosity of 4,000,000 to 6,000,000 centipoise at 25° C, a room temperature work life of 2 hours and was cured for 1 hour at temperatures of 300° F and post cured for 8 hours at a temperature of 400° F. The resulting elastomer was tested for physical properties and yielded the following results:

| Tensile Strength, psi | 600 |
|---|---|
| % Elongation | 360 |
| Shore A Durometer | 35 |
| Tear Strength, pi | 56 |

EXAMPLE 5

There was formed Component A which comprised 100 parts of which the various ingredients was 61.8 parts of the vinyl-terminated polymer of Example 3, 15.0 parts of the vinyltrimethylsiloxy terminated polymer of Example 3, 17.0 parts of silazane treated fumed silica, 12.0 parts of 10$\mu$ Minusil (alpha quartz) and 3.0 parts of a 1 million centipoise 13 mole percent methylvinylsiloxy content polymer of the formula,

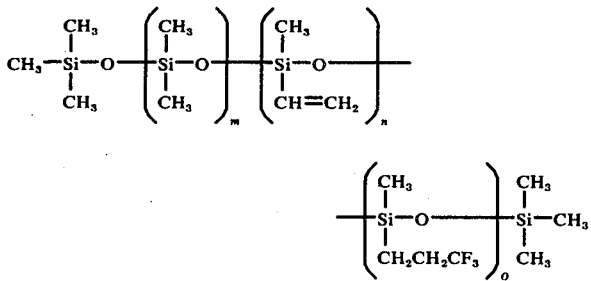

where the value of o is such that the polymer has a concentration of 37 mole percent methyltrifluoropropylsiloxy units and the value of n is such that the polymer has a concentration of 13.5 mole percent of methylvinylsiloxy units and the value of m is such as determined by the concentration of dimethylsiloxy units. To this polymer there is added 10 parts per million of platinum in the form of the platinum complex described in the foregoing Lamoreaux patent, and 1500 parts per million of tetramethyltetraallyltetracyclicsiloxane. To this Component A there was added a Component B which comprised 2.5 parts of the hydride resin of Example 3. The resulting mixture in the uncured state had a viscosity between 4,000,000 to 6,000,000 centipoise at 25° C and a work life at room temperature of 2 hours. The composition was cured for 1 hour at 300° F and was post cured for 8 hours at 400° F. This mixture in the cured state had the following physical properties:

| Tensile Strength, psi | 500 |
|---|---|
| % Elongation | 270 |
| Shore A Durometer | 47 |
| Tear Strength, pi | 75 |

The above examples illustrate the advantageous composition of the present case which has a low viscosity in the uncured state. As noted previously, in the uncured state heat vulcanizable silicone rubber compositions have viscosities of at least 50 million centipoise or more as compared to the 4,000,000 to 6,000,000 centipoise of the present composition.

In addition, as evidenced by the data given in the above examples, the present composition has desirable solvent resistant properties as well as physical properties comparable to heat vulcanizable silicone rubber compositions.

It should also be noted that the present composition prior to being used is prepared and manufactured into two separate components whereupon when cure is desired to form a silicone elastomer, the two components are mixed together.

It should be noted in this respect that it is not necessary for the vinyl-containing polymers to be present all in the first component or mixture A, as defined above and this is true also of the filler. Some of the filler and some of the vinyl-containing polymer may be packaged or prepared in the second component, that is, with a hydride cross-linking agent. In addition, the various additives with the exception of the platinum catalyst may be present or prepared in the second component.

I claim:

1. A solvent resistant room temperature vulcanizable silicone rubber composition comprising (A) 100 parts of a vinyl-containing polymer of the formula,

where Vi is vinyl, R is selected from the class consisting of alkyl radicals of 1 to 8 carbon atoms and phenyl, R' is perfluoroalkyl of 1 to 8 carbon atoms, x and y are at least 1 and the viscosity of the compound varies from 1,000 to 200,000 centipoise at 25° C, and the concentration of siloxy units taken y times varies from 5 to 98 mole percent; (ii) from 0.1 to 50 parts per million of the total composition of a platinum catalyst, and (B) from 1 to 50 parts based on 100 parts of the mixture (A) of a cross-linking polymer selected from the class consisting of (iii) a resin having

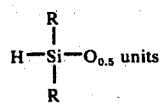

and SiO$_2$ units where the R to Si ratio varies from 1.0 to 2.7; (vi) a resin having
SiO$_2$ units and RR''SiO units where the R to Si ratio varies from 1.2 to 2.7 and (v) a polymer of the formula

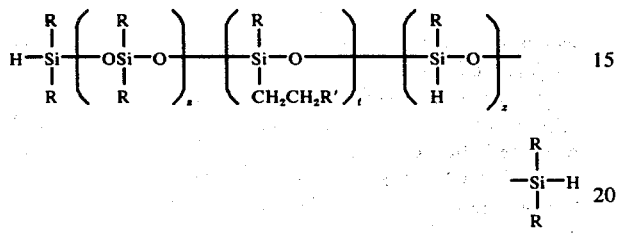

where R,R' are as previously defined, $s$ is at least 1, $t$ and $z$ may be zero or a positive integer and the viscosity of the polymer varies from 10 to 1000 centipoise at 25° C, where the concentration of siloxy units taken $t$ times varies from 0 to 75 mole percent, and R'' is selected from the class consisting of alkyl radicals of 1 to 8 carbon atoms and —CH$_2$CH$_2$R' radicals and in (A) (vi) from 1 to 85 parts per 100 parts of polymer (i) of a vinyl-containing compound of the formula,

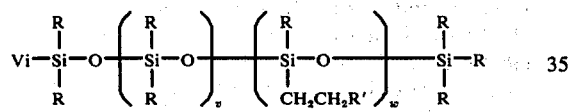

where, R, Vi, R' are as previously defined; $v$ and $w$ are at least 1, and the concentration of the Vi (R)$_2$SiO$_{0.5}$ units with respect to the total terminal units in the polymer varies from 20 to 100 mole percent and the viscosity of the polymer ranges from 100 to 20,000 centipoise at 25° C.

2. The composition of claim 1 wherein there is present in (A) from 5 to 100 parts of a filler which is selected from the class consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton and synthetic fibers.

3. The composition of claim 1 wherein there is present in (A) from 5 to 100 parts of a filler which is selected from the class consisting of fumed silica and precipitated silica which has been treated with a silicone compound.

4. The composition of claim 1 wherein R is methyl, R' is CF$_3$ and R'' is —CH$_2$CH$_2$CF$_3$.

5. The composition of claim 3 where the silicone compound is silazane.

6. The composition of claim 1 wherein in (A) there is present from 0.1 to 5 parts of iron oxide.

7. The composition of claim 1 wherein the platinum catalyst is a platinum complex with a vinyl-containing polysiloxane.

8. The composition of claim 1 wherein there is present in the total composition from 100 to 10,000 parts per million of a cure inhibitor which is an alkenyl-containing cyclicpolysiloxane.

9. The composition of claim 1 wherein the concentration of the units taken $y$ times in polymer (i) varies from 30 to 98 mole percent.

10. A process for forming a solvent resistant silicone elastomer comprising (a) mixing (A) 100 parts of a mixture composed of (i) 100 parts of a vinyl-containing polymer of the formula:

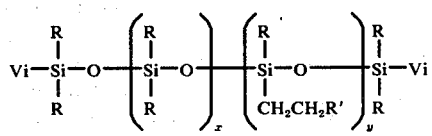

where V$i$ is a vinyl, R is selected from the class consisting of alkyl radicals of 1 to 8 carbon atoms and phenyl, R' is perfluoroalkyl of 1 to 8 carbonatoms, $x$ and $y$ are at least 1, and the viscosity of the compound varies from 1,000 to 200,000 centipoise at 25° C, and the concentration of siloxy unis taken $y$ varies from 5 to 98 mole percent; (ii) from 0.1 to 50 parts per million of the total composition of a platinum catalyst; with (B) from 1 to 50 parts based on 100 parts of the mixture (A) of a cross-linking polymer selected from the class consisting of (iii) a resin having

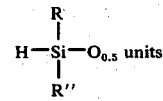

and SiO$_2$ units where the R to Si ratio varies from 1.0 to 2.7 (iv) a resin having

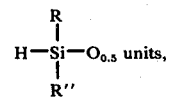

SiO$_2$ units and RR''SiO units where the R to Si ratio varies from 1.2 to 2.7; and (v) a polymer of the formula,

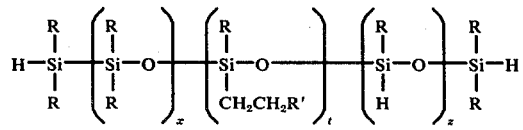

and mixtures thereof where the concentration of the units taken $t$ times varies from 0 to 75 mole percent where R, R' are as previously defined, $s$ is at least 1, $t$ and $z$ may be zero or a positive integer and the viscosity of the polymer varies from 10 to 1000 centipoise at 25° C and R'' is selected from the class consisting of alkyl radicals of 1 to 8 carbon atoms and —CH$_2$CH$_2$R' radicals and in (A) (vi) from 1 to 85 parts per 100 parts of polymer (i) of a vinyl-containing compound of the formula,

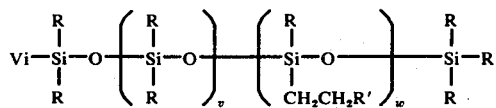

where R, Vi, R' are as previously defined, $v$ and $w$ are at least 1 and the concentration of the Vi $(R)_2SiO_{0.5}$ units with respect to the total terminal units in the polymer varies from 20 to 100 mole percent and the viscosity of the polymer ranges from 100 to 20,000 centipoise at 25° C and (b) allowing the mixture to cure.

11. The process of claim 10 wherein there is present in (A) from 5 to 100 parts of a filler which is selected from the class consiting of titanium dioxide, lithopone, zinc oxide, diatomaceous earth, zirconium silicate, silica aerogel, iron oxide, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton and synthetic fibers.

12. The process of claim 10 wherein there is present in (A) from 5 to 100 parts of a filler which is selected from the class consisting of fumed silica and precipitated silica which has been treated with a silicone compound.

13. The process of claim 10 where R is methyl, R' is $CF_3$ and R'' is $-CH_2CH_2CF_3$.

14. The process of claim 12 where the silicone compound is silazane.

15. The process of claim 10 wherein in (A) there is present from 0.1 to 5 parts of iron oxide.

16. The process of claim 10 wherein the platinum catalyst is a platinum compound with a vinyl-containing polysiloxane.

17. The process of claim 10 wherein there is present in the total composition from 100 to 10,000 parts per million of a cure inhibitor which is an alkenyl-containing cyclocpolysiloxane.

18. The process of claim 10 wherein the concentraton of the units taken $y$ times in polymer (i) varies from 30 to 98 mole percent.

19. The composition of claim 1 wherein there is further present per 100 parts of (i) 1 to 30 parts of a vinyl-containing polymer of the formula,

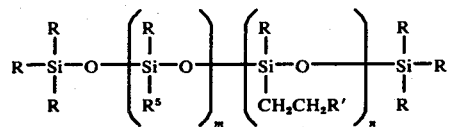

where $m$ and $n$ are at least 1, R is selected from lower alkyl radicals of 1 to 8 carbon atoms, R' is a perfluoroalkyl radical of 1 to 8 carbon atoms, $R^5$ is selected from alkyl radicals of 1 to 8 carbon atoms, vinyl radicals and mixtures thereof where the alkylvinylsiloxy content varies from 10 to 80 mole percent, and the viscosity of the polymer varies from 100,000 to 10,000,000 centipoise at 25° C.

20. The process of claim 10 wherein there is mixed in (A) from 1 to 30 parts of a vinyl-containing polymer of the formula,

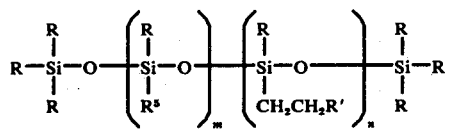

where $m$ and $n$ are at least 1, R is selected from lower alkyl radicals of 1 to 8 carbon atoms, R' is a perfluoroalkyl radical of 1 to 8 carbon atoms, $R^5$ is selected from alkyl radicals of 1 to 8 carbon atoms, vinyl radicals and mixtures thereof where alkylvinylsiloxy content varies from 10 to 80 mole percent and the viscosity of the polymer varies from 100,000 to 10,000,000 centipoise at 25° C.

* * * * *

UNITED STATES PATENT AND TRADEMARK OFFICE
CERTIFICATE OF CORRECTION

PATENT NO. : 4,029,629
DATED : June 14, 1977
INVENTOR(S) : Jeram

It is certified that error appears in the above—identified patent and that said Letters Patent is hereby corrected as shown below:

In col. 3, lines 10-15, the formula should appear as follows:

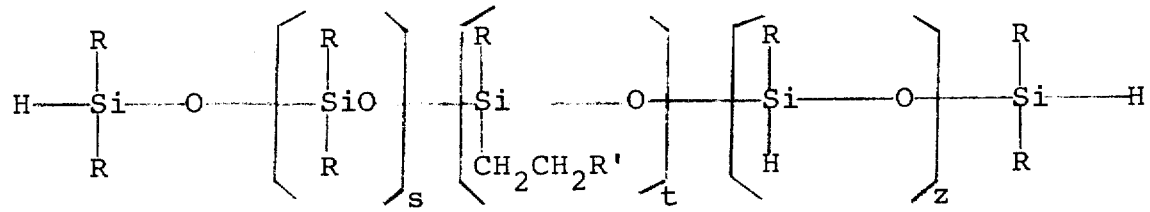

In col. 8, line 24, change "polysuloxane" to read -- polysiloxane --.

In col. 17, line 8, insert after "having", the following:

-- 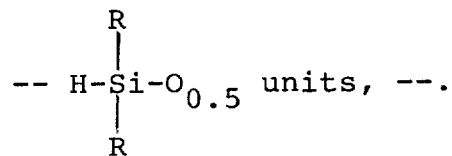 units, --.

UNITED STATES PATENT AND TRADEMARK OFFICE
CERTIFICATE OF CORRECTION

PATENT NO. : 4,029,629

DATED : June 14, 1977

INVENTOR(S) : Jeram

It is certified that error appears in the above—identified patent and that said Letters Patent is hereby corrected as shown below:

In col. 17, lines 11-22, the formula should appear as follows:

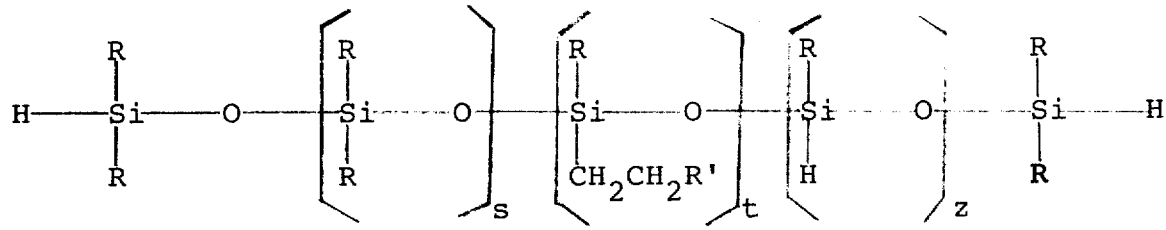

In col. 18, lines 50-57, the formula should appear as follows:

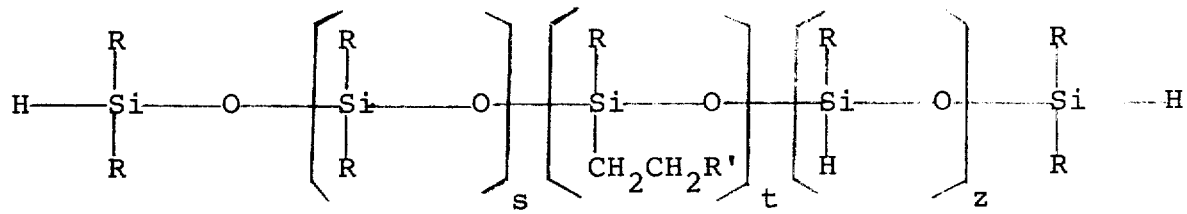

Signed and Sealed this

Seventeenth Day of August 1982

[SEAL]

Attest:

GERALD J. MOSSINGHOFF

Attesting Officer   Commissioner of Patents and Trademarks